Patented Apr. 15, 1947

UNITED STATES PATENT OFFICE 2,419,122

COPOLYMERS OF ALKYL ACONITATES AND VINYL CHLORIDE

Fred W. Cox, Cuyahoga Falls, Ohio, assignor to Wingfoot Corporation, Akron, Ohio, a corporation of Delaware No Drawing. Application June 29, 1943, Serial No. 492,715

5 Claims. (Cl. 260—78)

This invention relates to copolymers of vinyl chloride interpolymerized with esters of aconitic acid and to a method of preparing the same.

Vinyl chloride has been polymerized to make plastic masses having certain desirable properties which vary with the type of polymer obtained. Thus, gamma polyvinyl chloride possesses greater tensile strength and elongation than do the soluble polyvinyl chlorides. It also has the capacity of producing, when properly plasticized and processed, strong, elastic rubbery sheets. Nevertheless, its properties are not all that could be desired in a plastic, particularly one from which films, coatings, and molded articles are to be prepared. Accordingly, it is an object of this invention to provide polymerized compositions which not only possess the desirable properties of gamma polyvinyl chloride mentioned above, but also exhibit greater solubility in common organic solvents, better resistance to tear and better resistance to light. The new copolymers are also capable of being milled, molded, extruded, and otherwise manipulated at conveniently low temperatures.

The copolymers referred to are prepared from vinyl chloride and an ester of aconitic acid, this acid having the formula:

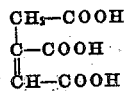

and being obtainable from sugar cane syrups, molasses, and other sugar wastes, and also from dehydration of citric acid. The esters employed in the manufacture of the copolymers are chiefly the trialkyl esters, such as trimethyl aconitate, triethyl aconitate, tripropyl aconitate, tributyl aconitate, and triamyl aconitate. Other similar tri esters can readily be prepared by esterification of the acid with the appropriate alcohol, and may also be interpolymerized with vinyl chloride to form copolymers.

The copolymers may be made by methods well known in the art, as by the use of ultraviolet light, or by heating with or without a solvent, or, preferably, by emulsion polymerization. To illustrate some of the methods of procedure which may be employed in securing the copolymer, the following examples are given, but it will be understood that the invention is not limited to the details set forth therein.

Example 1

A mixture of 23.8 grams of vinyl chloride, 1.2 grams of tributyl aconitate, 15 ml. of 3% Duponol ME solution (sodium dodecyl sulfate), 15 ml. of 0.2 molar disodium phosphate buffer and 0.12 gram of $NaBO_3 \cdot 4H_2O$ was sealed in a small bomb and rotated end over end in a 38° C. constant temperature bath. After thirty-nine hours, the contents had set up to a mealy mass. The bomb was opened, and the polymer washed free of soap and salts. The product was obtained in the form of a white powder. While the polymerization was continued until the product had coagulated, it is usually preferable to discontinue the reaction while the product is in the form of a latex and then to break the emulsion by known methods, such as by salting out, adding alcohol, or freezing.

Example 2

A mixture of 22.5 grams of vinyl chloride, 2.5 grams of tributyl aconitate, 25 grams of methanol, and 0.75 gram of benzoyl peroxide was sealed in a small bomb which was rotated at a constant temperature of 38° C. After several days, the contents of the bomb had set up to a semisolid mass. The bomb was opened and the reaction mixture was diluted with methanol, whereafter the copolymer was filtered off as a fine white powder.

Example 3

A series of runs was conducted in the same manner as set forth in the preceding examples, but with varying proportions of the two monomers, as well as variations of the hydrogen-ion concentration and of the catalyst employed. An aqueous emulsion was used except where the polymerization was carried on in methanol as a solvent. The results obtained are tabulated below:

| Ratio VCl/TBA | pH | Per cent Catalyst | Set-Up Time (Hours) | Nature of Product |
|---|---|---|---|---|
| 95/5 | 7.0 | 0.5 $NaBO_3$ | 119 | White powder. |
| 90/10 | 7.0 | do | 160 | Do. |
| 80/20 | 7.0 | do | 328 | Do. |
| 70/30 | 7.0 | do | 544 | Soft mass. |
| 60/40 | 7.0 | do | 544 | Soft sticky mass. |
| 50/50 | 7.0 | do | 544 | Do. |
| 95/5 | 8.5 | do | 39 | White powder. |
| 90/10 | 8.5 | do | 95 | Do. |
| 80/20 | 8.5 | do | 375 | Do. |
| 70/30 | 8.5 | do | 375 | Soft mass. |
| 60/40 | 8.5 | do | 375 | Soft sticky mass. |
| 90/10 | Methanol | $3Bz_2O_2$ | 255 | White powder. |
| 80/20 | do | do | 423 | Do. |

CODE.—VCl—vinyl chloride; TBA—tributyl aconitate; $Bz_2O_2$—benzoyl peroxide.

It will be noted that a copolymer was obtained in each instance, the characteristics of the product varying.

The emulsion polymerization of the vinyl chloride and aconitic acid ester may be modified within practical limits. Thus, the emulsifying agent may be sodium oleate, any of the various commercial fatty alcohol sulfates, aliphatic sulfonates, alkyl aryl sulfates, etc. The catalyst employed is preferably one of the per-oxygen type, such as sodium peroxide, benzoyl peroxide, soditium perborate, potassium persulfate, and hydrogen peroxide, although other polymerization catalysts, such as lead tetraethyl, and actinic light may also give favorable results. The temperature employed is usually one between 30° and 80° C., with an optimum range of 38° to 50° C. More catalyst can be employed than the concentration indicated above, and the hydrogen-ion concentration may be varied in the direction of greater alkalinity in order to shorten the time of polymerization. Of course, other emulsion systems than those given may be employed and will be adjusted for best results in view of the characteristics of the particular system.

It will be noted that certain of the runs given in Example 3 above illustrate polymerization in a solvent, methanol; other solvents can, of course, be employed for this solution polymerization. For example, acetone, methyl ethyl ketone, ethylene dichloride, toluene, benzene, petroleum ether, excess monomer, dioxane, etc.

Several of the resins prepared by the procedure of the foregoing examples were mixed with a plasticizer and milled into strong, transparent, rubbery sheets. Still others were dissolved in ethylene dichloride to form cements containing at least 10% solids. These cements were spread out on glass plates to form films which were then tested for tensile strength, elongation, tear resistance, and resistance to ultra violet light. The following tabulation lists the results obtained:

| Ratio VCl/TBA | pH | Milled Sheets | | Cast Sheets | | | |
|---|---|---|---|---|---|---|---|
| | | Per cent BEP | Nature | Ultimate Tensile, kg./cm.² | Elongation, per cent | Tear Strength, gms./in. | Fadeometer Test, Hours |
| 95/5 | 7.0 | 35 | Strong, rubbery_ | 483 | 4 | 75 | 200 |
| 90/10 | 7.0 | 35 | Moderately Strong, rubbery_ | 366 | 4 | 89 | 200 |
| 80/20 | 7.0 | 25 | Moderately Strong, rubbery_ | Brittle | | | |
| 95/5 | 8.5 | 40 | ____do____ | 600 | 4 | 142 | 200 |
| 90/10 | 8.5 | 40 | Strong, rubbery_ | 437 | 6 | 189 | 200 |
| 80/20 | 8.5 | 30 | Moderately Strong, rubbery_ | Brittle | | | |
| 100/0 | 7.0 | 40 | ____do____ | 522 | 8 | 31 | 50 |

CODE.—BEP—butoxy ethyl phthalate.

It will be observed that a polyvinyl chloride was included for purposes of comparison and that this control showed decidedly less tear strength and resistance to the fadeometer than did the copolymers. While certain of the cast copolymers formed brittle films, they may be used for other purposes, such as in plasticized films, lacquers, coatings, baked enamels, etc. This may also be done with those copolymers which are suitable for the formation of films. The amount of plasticizer employed may, of course, be varied to improve the properties of the copolymer for one use or another, and the cements from which films are formed may contain from 5% solids upwards to the capacity of the solvent. The ethylene dichloride employed as a solvent from which films are cast may be replaced by other solvents such as methyl ethyl ketone, butyl acetate, dioxane, nitrobenzene, and various solvent mixtures of these and others. Useful copolymers may be prepared from mixtures of monomers containing from about 95% to 60% of vinyl chloride and correspondingly, from about 5% to 40% of the aconitic acid ester, but best results from the point of view of copolymer properties and yields are obtained in the range from about 80% to 95% of the vinyl chloride, and about 20% to 5% of the aconitic acid ester. All of these proportions are based on the total weight of the monomers reacted.

While there have been described above certain preferred embodiments of the invention, it will be apparent to those skilled in the art that various modifications and changes may be made therein without departing from the spirit of the invention or from the scope of the appended claims.

I claim:
1. Copolymers of vinyl chloride interpolymerized with a trialkyl ester of aconitic acid in the proportion of about 80% to 95% of the vinyl chloride and about 20% to 5% of the ester on the total weight of monomers.

2. Copolymers of vinyl chloride interpolymerized with tributyl aconitate in the proportion of about 80% to 95% of the vinyl chloride and about 20% to 5% of the ester on the total weight of monomers.

3. Copolymers of vinyl chloride interpolymerized with triethyl aconitate in the proportion of about 80% to 95% of the vinyl chloride and about 20% to 5% of the ester on the total weight of monomers.

4. Copolymers of vinyl chloride interpolymerized with trimethyl aconitate in the proportion of about 80% to 95% of the vinyl chloride and about 20% to 5% of the ester on the total weight of monomers.

5. A method of preparing a copolymer which comprises mixing one part by weight of trialkyl aconitate, 4-19 parts of vinyl chloride, an emulsifying agent, an oxygen yielding catalyst and a buffer salt adapted to maintain the reaction mass at a pH value greater than 7.0, heating the mass at a temperature between 38 and 50° C. while agitating continuously until the polymerization is complete, and separating the copolymer.

FRED W. COX.

REFERENCES CITED

The following references are of record in the file of this patent:

UNITED STATES PATENTS

| Number | Name | Date |
|---|---|---|
| 1,945,307 | Dykstra | Jan. 30, 1934 |
| 2,200,429 | Perrin | May 14, 1940 |
| 2,221,662 | Rothrock (1) | Nov. 12, 1940 |
| 2,221,663 | Rothrock (2) | Nov. 12, 1940 |
| 2,273,262 | Hanson | Feb. 17, 1942 |
| 2,160,931 | Wiley | June 6, 1939 |

FOREIGN PATENTS

| Number | Country | Date |
|---|---|---|
| 814,093 | French | Mar. 8, 1937 |